United States Patent
Verstraeten et al.

(10) Patent No.: US 9,671,132 B2
(45) Date of Patent: Jun. 6, 2017

(54) TANK WITH HEATING ELEMENT FOR SELECTIVE CATALYTIC REDUCTION

(75) Inventors: Steve Verstraeten, Antwerp (BE); Filip Lanckmans, Lennik (BE); Inge Schildermans, Marke (BE); Veerle Van Wassenhove, Aarsele (BE); Lieven Tack, Roeselare (BE)

(73) Assignee: NV BEKAERT SA, Zwevegem (BE)

( * ) Notice: Subject to any disclaimer, the term of this patent is extended or adjusted under 35 U.S.C. 154(b) by 550 days.

(21) Appl. No.: 14/131,075

(22) PCT Filed: Jul. 3, 2012

(86) PCT No.: PCT/EP2012/062919
§ 371 (c)(1),
(2), (4) Date: Jan. 6, 2014

(87) PCT Pub. No.: WO2013/004693
PCT Pub. Date: Jan. 10, 2013

(65) Prior Publication Data
US 2014/0153912 A1    Jun. 5, 2014

(30) Foreign Application Priority Data

Jul. 7, 2011 (BE) .................................. 2011/0425
Jul. 7, 2011 (BE) .................................. 2011/0426

(51) Int. Cl.
*F24H 9/18* (2006.01)
*F01N 3/20* (2006.01)
(Continued)

(52) U.S. Cl.
CPC ............... *F24H 9/18* (2013.01); *B01D 53/00* (2013.01); *F01N 3/2066* (2013.01); *F23J 15/04* (2013.01);
(Continued)

(58) Field of Classification Search
CPC .......... F24H 9/18; F24H 1/202; F24H 9/1818; F24H 2250/02; F23J 15/00; B01D 53/00;
(Continued)

(56) References Cited

U.S. PATENT DOCUMENTS 3,796,858 A * 3/1974 Cohn ................... A01K 63/065
119/256
4,983,814 A * 1/1991 Ohgushi ................ D02G 3/441
219/212
(Continued)

FOREIGN PATENT DOCUMENTS

EP    2 216 524 A1    8/2010

*Primary Examiner* — David Angwin
*Assistant Examiner* — Biniam Asmelash
(74) *Attorney, Agent, or Firm* — Foley & Lardner LLP

(57) ABSTRACT

The invention describes a tank comprising a water or solvent based solution, dispersion or emulsion. The tank comprises an electrical resistance heating element immersed in the solution, dispersion or emulsion. The electrical heating element is provided in the tank with an electrical current. The electrical resistance heating elements comprises a textile fabric and at least one electrical heating wire. The electrical heating wire is fixed onto the textile fabric and the electrical heating wire comprises metal filaments or metal fibers.

18 Claims, 1 Drawing Sheet

(51) Int. Cl.
  *H05B 3/82* (2006.01)
  *H05B 3/12* (2006.01)
  *H05B 3/56* (2006.01)
  *B01D 53/00* (2006.01)
  *F24H 1/20* (2006.01)
  *F23J 15/04* (2006.01)

(52) U.S. Cl.
  CPC ........... *F24H 1/202* (2013.01); *F24H 9/1818* (2013.01); *H05B 3/12* (2013.01); *H05B 3/56* (2013.01); *H05B 3/82* (2013.01); *F01N 2610/02* (2013.01); *F01N 2610/10* (2013.01); *F01N 2610/1406* (2013.01); *F23J 2215/10* (2013.01); *F23J 2219/20* (2013.01); *F24H 2250/02* (2013.01); *H05B 2214/02* (2013.01); *Y02T 10/24* (2013.01)

(58) Field of Classification Search
  CPC ... H05B 3/12; H05B 3/56; H05B 3/82; H05B 2214/02; Y02T 10/24; F01N 3/2066; F01N 2610/1406; F01N 2610/02; F01N 2610/10
  USPC ......... 392/441, 468, 480; 291/528–529, 545, 291/549
  See application file for complete search history.

(56) References Cited

U.S. PATENT DOCUMENTS

| | | | | |
|---|---|---|---|---|
| 5,725,953 | A | * | 3/1998 | Onishi .................. H01B 3/303 174/110 FC |
| 5,905,849 | A | * | 5/1999 | Ito ........................ A01K 63/065 219/523 |
| 6,452,138 | B1 | * | 9/2002 | Kochman .......... A41D 13/0051 219/529 |
| 2001/0002669 | A1 | * | 6/2001 | Kochman .......... A41D 13/0051 219/545 |
| 2002/0117495 | A1 | * | 8/2002 | Kochman ................ H05B 3/34 219/549 |
| 2004/0115110 | A1 | * | 6/2004 | Ripper ................... B01D 53/90 423/235 |
| 2005/0063689 | A1 | * | 3/2005 | Auber ................... F01N 3/2066 392/468 |
| 2008/0047955 | A1 | * | 2/2008 | Rock .................. A41D 31/0038 219/545 |
| 2008/0149620 | A1 | * | 6/2008 | Li .......................... H05B 3/146 219/545 |
| 2008/0223021 | A1 | * | 9/2008 | Shaikh .................. F01N 3/2066 60/287 |
| 2009/0183778 | A1 | * | 7/2009 | Wildegger ............. B60S 1/487 137/13 |

* cited by examiner

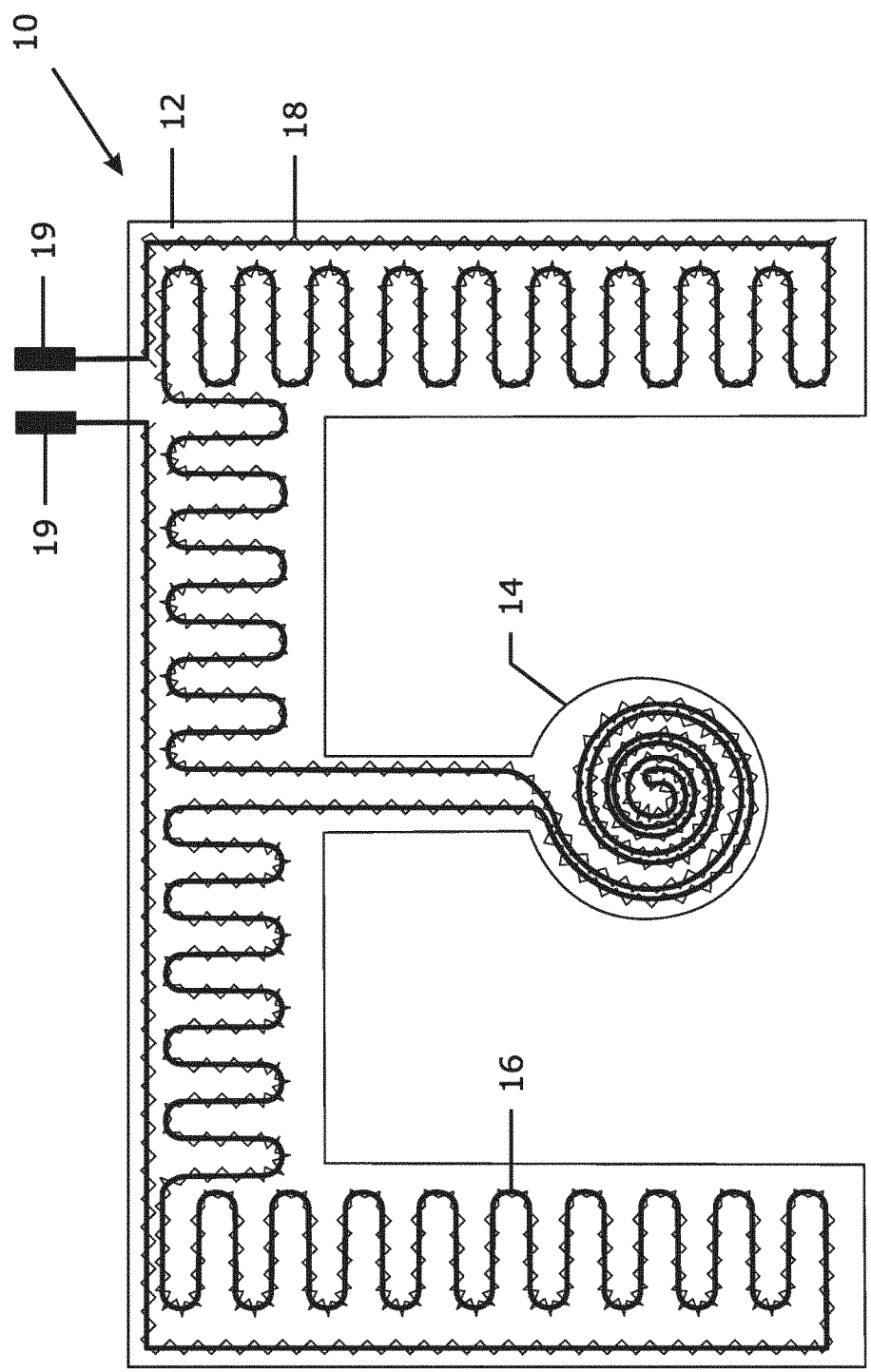

TANK WITH HEATING ELEMENT FOR SELECTIVE CATALYTIC REDUCTION

TECHNICAL FIELD

The invention relates to a tank for use in a selective catalytic reduction system (SCR) and an electrical resistance heating system for it. Such tanks are for instance used in cars and contain the reductor for the catalytic reduction or a precursor for this reductor. The electrical resistance heating element according to the invention is immersed in the tank and comprises a textile fabric as carrier onto which an electrical heating wire is fixed.

BACKGROUND ART

A number of countries has legislation containing maximum limits for the emission of nitrogen oxides (NOX) in exhaust gases of vehicles driven by combustion engines. A method to reduce the amount of NOX in the exhaust is the use of selective catalytic reduction (SCR). In SCR systems, NOX in the exhaust gas are converted via a reductive chemical reaction into nitrogen and water. The conversion involves a catalytic reaction using a reductor. Ammonia is frequently used as reductor. The ammonia is obtained by disintegration of a precursor solution containing ammonia or urea. The precursor liquid is injected in the exhaust gas flow. To this end a car has one or more tanks containing the precursor liquid. An example of such precursor liquid is AdBlue (trademark of VDA, Verband der Automobilindustrie), commercial name of a water based solution containing 32.5% urea. Other examples are urea/ammonia formate solutions (e.g. sold under the commercial name Denoxium). Such precursor solutions are very corrosive.

Most water based precursor solutions can freeze at temperatures that occur in nature (e.g. a water based solution of 32.5% urea freezes at minus 11° C.). Therefore a heating element is required to thaw the precursor tank when the precursor liquid in the tank is frozen. The heating element can also be used to heat the precursor liquid to a suitable operational temperature.

Heating systems to be immersed in SCR tanks have to answer a number of requirements. A first requirement is that the heating systems must be able to generate a sufficient amount of heat in order to thaw and/or heat the required amount of liquid in a sufficiently short time period. The required amount of heat depends on the volume of the tank, and in particular on the maximum amount of precursor liquid the tank can contain. The dimensions of the heating element have to be limited to leave sufficient space in the tank for the tank to contain a sufficient volume of precursor liquid without the tank and the accessories in and around the tank becoming to voluminous. It is requested that heating is performed first around the pump that is pumping the precursor liquid out of the tank, but other sections of the tank also have to be thawed and heated. Preferably, the heating system can heat different sections of the tank (e.g. remote sections in the tank or sections that are physically separated from other sections of the tank). Thawing should not only be performed around the pump, but also in other sections, such that precursor liquid is available at and towards the pump. The tank can have a complex design, with different accessories provided in the tank (pumps, sensors . . . ). Heating systems immersed in the tank are very efficient in terms of transfer of energy (heat) to the (frozen) precursor liquid. However, the immersed heating system should also be resistant to the conditions in the tank: the corrosive precursor (or volatile components, such as ammonia) and temperatures that in use can go up to over 100° C. Required is a long life time of the heating element, without change over time of its characteristics (including generation of heat). Electrical (resistive) heating systems have to be energy efficient, and have to be able to operate without demanding (too) large amounts of energy from the battery of the vehicle, which is especially of importance when starting the vehicle in cold weather conditions. Manufactures of SCR systems prefer heating systems that are easy to install.

A number of different systems have been developed to thaw and heat the tank that is containing the precursor liquid. Some systems comprise separate resistive heating elements or a bypass of hot liquid or of hot gas around or through the tank. In general the heating systems are complex and expensive.

WO2008/138960 describes a urea tank and a base plate with an integrated heating element wherein the heating element comprises at least one flexible part that preferably consists out of an electrical resistance track fixed onto a flexible film and/or placed between two flexible film layers. The complex composition of heating is a drawback and—although flexible films are used—a further drawback is the rather high stiffness of the of the heating element. The latter is making it more difficult to install the heating element in the tank, especially in remote sections of the tank. No liquid flow is possible through the films, limiting the capacity of fluid flow in the tank. Liquid flow in the tank is favorable to equalize the temperature in the tank and to increase the efficiency of the thawing process.

EP-A1-2216524 is disclosing a urea strainer that is including a mesh for removing impurities from urea passing therethrough and heatable wires to heat the urea as it passes through the mesh. The urea is provided to an emission control system of a diesel engine. It is a disadvantage of the heating element that only local heating in the tank is possible.

DISCLOSURE OF THE INVENTION

It is the objective of the invention to provide a selective catalytic reduction (SCR) tank with an improved resistance heating system. It is a specific objective to provide an SCR tank with an electrical resistance heating element that has a large design freedom, such that in design it can be foreseen to generate sufficient heat in the tank where most heat is required.

The heating system of the SCR tank according to the invention fulfills the requirements of durability (corrosion resistance and life time), as the electrical resistance of the heating element remains sufficiently constant over the lifetime of the heating element. The heating system has a higher flexibility (=lower stiffness), facilitating the installation in the tank, especially the installation in remote sections of the tank.

The invention relates to a tank that is comprising a water or solvent based solution, dispersion or emulsion. The tank comprises an electrical resistance heating element that is immersed in the solution, dispersion or emulsion. The electrical resistance heating element is provided in the tank with electrical current. The electrical resistance heating element comprises a textile fabric and at least one electrical heating wire fixed onto the textile fabric. At least one of the one or more electrical heating wires comprises metal filaments or metal fibers. Preferably, all electrical heating wires comprise metal filaments or metal fibers.

The tank can be made out of any suitable material, preferably out of a material with a high chemical resistance against the precursor liquid that contains for instance urea. Metals and plastics, e.g. polyolefins (and especially high density polyethylene) and polyamides, are highly suitable. The tank can be made using any method that is suited for the production of hollow objects. To produce a plastic tank, technologies such as blow molding and injection molding are particularly suited.

The tank can e.g. have a maximum volume between 1 and 25 liter; for instance between 3 and 22 liter; for instance between 4 and 15 liter. The invention is especially beneficial for tanks in the higher range of the volume range (e.g. tanks of more than 10 liter). The larger the volume of the tank, the more difficult to thaw and heat the volume of liquid in the tank.

The tank can comprise a precursor for selective catalytic reduction, e.g. for the catalytic reduction of nitrogen oxides. The tank can e.g. contain a water based solution of 32.5% urea. An example of such a water based solution is known under the commercial name AdBlue. Other example are water based urea/ammonia formate solutions (as e.g. sold under the trademark Denoxium). Urea/ammonia formate solutions have the benefit to freeze at lower temperatures than 32.5% urea solutions, but have the drawback that formic acid can be formed, resulting in very corrosive conditions.

Preferably, the textile fabric is positioned in the tank such that is follows a double curved or three dimensional surface. It is a benefit of this embodiment that different sections of the heating tank, including remote sections of the tank, can be provided with heating in an easy and flexible way. The textile fabric can have any shape, e.g. square, rectangular, or with legs and or parts, it can have a convex or concave shape. The double curved or three dimensional surface can e.g. be provided by cutting and folding legs of the fabric, each leg comprising part of a heating cord and/or by draping the fabric in a curved way in the tank, thereby departing from the flat 2D-fabric. It is also possible that parts of the fabric are given a three-dimensional shape via bending in more than one plane. Hence, the fabric or parts of the fabric—with the heating cord fixed to it—can be given a double bent shape in the tank. This way, heating can be more directed to specific locations in the tank.

Preferably the textile fabric is an open fabric. With open fabric is meant a textile fabric that has a cover factor substantially lower than 1 (meaning below 0.9). The cover factor is the fraction of surface covered by the yarns of the fabric compared to the area covered by the textile fabric. At a fabric with cover factor equal to 1, the total surface is covered by yarns and there is no open space between the yarns that build the fabric; at a cover factor equal to 0.5, half of the surface is covered by yarns and half the surface is not covered in that space is present between the yarns that build the fabric.

Preferably in the invention a textile fabric is used with cover factor below 0.7, more preferably with cover factor below 0.6.

It is a specific benefit of the use of an open textile fabric (and particularly with cover factor below 0.7 and more particularly with cover factor below 0.6) that the heating element allows sufficient fluid flow in the tank, through the textile fabric. Such fluid flow can occur when differences in temperature in the tank are present. The fluid flow supports the equalizing of the temperature of the fluid in the SCR tank.

In a specific embodiment, the textile fabric is a woven fabric. Preferably the fabric has a linen weave or a twill weave. Other examples of weaves that can be used are leno weaves, where warp yarns are twisted around each other to obtain a more firm binding between warp and weft yarns. A fabric with a leno weave has a better resistance against shearing deformation and against shifting of yarns in the fabric, as a consequence distortions of the textile fabric are prevented.

A part of all of the warp yarns and/or part of or all weft yarns can be monofilaments, for instance polyamide 6 or polyamide 6.6 or polyethylene or polyethylene or PEEK (polyetheretherketon) or PTFE (polytetrafluorethylene). Alternatively part of or all warp yarns and/or part of or all weft yarns can be tapes, for instance polyethylene or polypropylene tapes. Glass yarns can be used as well. Use of yarns such as PEEK or PTFE allow high operational temperatures in the tank thanks to the higher temperature resistance of such materials.

In an alternative embodiment, the textile fabric is a knitted fabric, e.g. a warp knitted fabric. The warp knitted fabric can comprise inlay yarns in weft and/or in warp direction. The warp knitted fabric can for instance comprise weft yarn laid in over the full width of the warp knitted fabric. The warp knitted fabric can also comprise standing warp yarns, laid in straight in production direction of the fabric. It is known in the technology of warp knitting to fix laid in yarns with one or more sets of warp yarns that build stitches. The warp knitted fabric can comprise monofilaments or tapes or tape yarns. Materials that can be used are for instance polyamide 6, polyamide 6.6, polyethylene, polypropylene, PEEK (polyetheretherketon), PTFE (polytetrafluorethylene) . . . . Glass yarns can be used as well. Use of yarns such as PEEK or PTFE allow high operational temperatures in the tank thanks to the higher temperature resistance of such materials.

The textile fabrics used in the invention have the required elastic flexibility in order to install the electrical resistance heating element easily in the heating tank in the required way and location, even when the fabric need to be installed forming a double curved or three dimensional surface in the tank. The benefit of using a knitted fabric, e.g. a warp knitted fabric is an even higher flexibility, as the textile fabric can be more easily deformed elastically, beneficial for installation in the tank.

The textile fabric can be a coated fabric, e.g. coated with silicone or polyurethane or with another suitable polymer to increase the chemical resistance. It is also possible to coat the textile fabric after fixation of the electrical heating wire onto it. The textile fabric can comprise yarns. Preferably, one or more sets of yarns in the textile fabric are monofilaments. If the textile fabric comprises thermoplastic fibers, thermoplastic yarns or thermoplastic monofilaments, it can be stabilized thermally. It is also possible to give the fabric a thermal treatment such that thermoplastic fibers, thermoplastic yarns or thermoplastic monofilaments are bonded to each other at their points of contact.

When a polymer coating is provided on the textile fabric, the polymer coating provides improved chemical and corrosion resistance to the textile fabric. The polymer coating also provides better resistance to distortion or damage of the fabric, e.g. of permanent distortion of the position of yarns in the fabric, e.g. due to shear. This is of particular importance when an open textile fabric is used (and especially with a cover factor lower than 0.7 and certainly with a cover factor below 0.6), as such open textile fabrics could be distorted or damaged easily (e.g. formation of holes in the fabric). The coating provides a higher resistance against shear deformation. An alternative way to prevent shear deformation is thermal bonding of thermoplastic fibers, thermoplastic yarns or thermoplastic monofilaments in the textile fabric.

The textile fabric can for instance be coated with a polyurethane coating. In order to obtain superior properties in terms of lifetime silicone coatings or fluorine comprising coatings can be used. Examples of fluorine comprising coatings that can be used in the invention are PFA (perfluoroalcoxy), MFA (Tetrafluorethylene), Perfluormethylvinylether; PPS (polyfenylene sulfide), FEP (fluorinated ethylene propylene), ETFE and PTFE (polytetrafluoroethylene).

It is a benefit of the invention that the electrical heating element is flexible, easy to bend. The electrical heating wires can be fixed in one or more tracks over the surface of the textile fabric. (that acts as a carrier for the electrical heating wire), such that the required heat generation in the different sections of the tank can be determined easily. It means that the power density (density of heat generation) can be determined according to the position in the tank.

Preferably the diameter of the metal fibers or metal filaments is between 50 and 250 micrometer.

Preferably, the equivalent diameter of the heating wire is between 0.6-2 mm. With equivalent diameter is meant the diameter of a perfectly round wire with the same cross sectional area as the cross section of the wire that is considered (and which is not necessarily of perfect round shape). Finer metal filaments offer the benefit that more flexible heating wires can be obtained.

In a specific embodiment a number of metal fibers and/or metal filaments (and possibly in combination with non-metal fibers or non-metal filaments) are twisted into a strand. Several same or different strand scan be twisted together. According to the invention it is possible to use such a strand or combination of strands as resistance heating wire. It is a benefit of such combined heating wires that they are very flexible, enabling their fixation onto the textile fabric. It allows to provide the heating wire with shorter bends on the textile fabric, beneficial when developing the heating elements with suitable geometrical generation of heat as a function of the design of the SCR-tank.

Preferably the total length of the heating cord on the textile fabric is between 0.8 and 20 meter, more preferably between 3 and 12 meter, even more preferred between 5 and 7.5 meter. It is possible to fix more than one heating wire (in parallel or in series) on the textile fabric, thereby creating more than one heating circuit on the textile fabric. For instance two circuits of each 7.2 meter length can be provided in the tank. A first circuit can be provided immediately below the pump (the pump is e.g. centrally positioned in the tank) and a second circuit in the remainder of the volume of the tank. It is also possible that a heating wire fixed onto the textile fabric is combined with one or more heating wires put in the tank.

The metal filaments or metal fibers can comprise a layer that provides corrosion resistance to the metal filaments or metal fibers. Such layer can be a polymer layer (e.g. a polyurethane layer), or a metal oxide layer, or a layer of another, more corrosion resistant metal (e.g. zinc or tin or nicker or stainless steel).

Metal filaments have in principle an infinite length, whereas metal fibers have a specific finite length or length distribution. Several types of metal filaments or metal fibers can be used in the invention. Examples of such metal filaments or of such metal fibers that can be used in the invention are:

filaments or fibers that have a layer in copper or a copper alloy and a surrounding layer in steel. The surrounding layer is preferably stainless steel;

filaments or fibers with a layer of steel, with a surrounding layer in copper or a copper alloy and again surrounded by a layer in nickel, zinc or tin;

filaments or fibers with layer of stainless steel, or having stainless steel as only metal layer;

nickel super alloy (e.g. Inconel or Hastelloy); the benefit of nickel super alloys is their even high resistance to corrosion than stainless steel.

filaments or fibers with a layer of steel (stainless steel, low carbon steel or high carbon steel), surrounded by a layer of a more corrosion resistant metal, e.g. nickel, zinc or tin;

filaments or fibers comprising at least one layer in copper or a copper alloy (e.g. copper-nickel alloys), or consisting out of copper or a copper alloy; such filaments can comprise a surrounding layer of a more corrosion resistant metal, e.g. nickel, zinc or tin.

A low carbon steel is a steel grade having for all elements of the alloy a weight percentage below 0.5% (obviously with the exception of iron and possibly with the exception of silicon and manganese), for instance below 0.2% by weight; and a percent by weight of carbon below 0.3%. The invention advantageously uses a low carbon steel grade with a carbon percentage by weight below 0.2%, even more preferred is a carbon weight percentage below 0.06%.

A high carbon steel is a steel grade with a carbon weight percentage between 0.3 and 1.7. The invention advantageously uses high carbon steel with a carbon weight percentage between 0.4 and 0.95%, even more preferred is a carbon weight percentage between 0.55 and 0.85%. High carbon steel may contain alloy elements.

Preferably the resistance heating wire has a smallest bending radius smaller than 1.5 times the diameter of the heating wire. The smallest bending radius is determined by making by hand a bend as short as possible. The radius of this bend (which is the smallest bending radius) can be measured in a number of ways. One way is the use of thickness gauges, looking for the thickest gauge that can be put in the bent of the wire.

It is a benefit when the heating wire is flexible, when it can be bent easily. The heating wire can be fixed to the textile fabric with sharper or smaller bends in the heating wire, beneficial for the power density on the textile fabric. It is another benefit that the resistance heating element is more flexible, facilitating its insertion and positioning in the tank. It is also more easy to provide the fabric according to a double curved or three dimensional surface in the tank.

The resistance heating wire preferably comprises a polymer coating layer. A function of the polymer coating layer is to provide improved corrosion resistance to the resistance heating wire (also against electrochemical corrosion). The coating layer on the resistance heating wire prevents short circuits when two positions along one or more heating wires would make contact in the SCR tank. It should be mentioned that the fixation of the heating wire on the textile fabric already prevents unwanted contact of heating wires.

Examples of coatings that can be used are silicone coatings. Other examples of coatings that can be used are TPE (thermoplastic elastomer), polyurethanes and polyamides.

In a specific embodiment of the invention the heating wire is comprising a fluorine comprising polymer coating layer. Fluorine coating layers on the heating wire have a good chemical (corrosion) resistance and temperature resistance for use in SCR-tanks, where temperatures can amount during use up to for instance 150° C. Examples of fluorine comprising coatings that can be used in the invention are PFA (perfluoroalcoxy), MFA (Tetrafluorethyleen), Perfluormethylvinylether, PPS (polyfenyleensulfide), FEP (fluorinated ethylene propylene), ETFE (Ethylene-tetrafluorethylene copolymer) and PTFE (polytetrafluorethylene).

Fluorine comprising polymers have a high temperature resistance and an excellent corrosion resistance.

For application in SCR systems with a urea or ammonia precursor, PFA, MFA and ETFE have proven to provide the best lifetime to the resistance heating wire, e.g. better than TPE (thermoplastic elastomer).

In order to provide resistance against corrosion, a metal filament or metal fiber with a metal oxide or with a layer with a more corrosion resistant material (such as zinc, tin, nickel or stainless steel) as outer metal layer in combination with a polymer coating layer of the heating wire has shown to be very beneficial. The polymer coating provides corrosion resistance, but cannot completely prevent diffusion of corrosive gases (e.g. ammonia) through the polymer coating layer. Therefore, a corrosion resistant outer metal layer of the metal fiber or metal filament is preferred. With only a corrosion resistant outer metal layer, there is a risk of occurrence of electrochemical corrosion, which can be prevented by a polymer coating layer on the resistance heating wire or on the individual metal fibers and/or metal filaments, and providing maximum lifetime of the heating element.

When a polymer coating layer is provided on the heating wire, the coating layer preferably has a thickness between 0.15 and 0.6 mm. An important function of the coating layer of the heating cord (next to providing resistance against electrochemical corrosion, high temperature resistance and the improvement of the durability) is the determination of the thickness of the heating cord to limit the generation of heat per unit of surface area of the heating cord, for instance 0.3-0.9 W/cm$^2$, more preferred between 0.35-0.6 W/cm$^2$. This limitation in generation of heat is required to prevent that the precursor liquid gets locally too hot which would lead to the generation of gaseous products (e.g. excessive generation of gaseous ammonia). As a result, the pressure in the tank would increase and the life time of the heating cord would decrease due to increased diffusion through the coating. The thicker the coating layer, the lower the heat generation per unit of area of the surface of the heating cord will be. Copper for instance is a better conductor but will require a thicker coating layer to satisfy the requirement of limitation of heat generation per unit of surface area of the heating wire.

The fixation of the resistance heating wire (or resistance heating wires) onto the textile fabric can e.g. be done via stitching by means of a stitching yarn, or by means of welding (e.g. ultrasonic welding to a textile fabric that is comprising thermoplastic polymers). The fixation is done via a predetermined pattern. The pattern is selected among other reasons by the shape of the tank.

After fixing the resistance heating wire (or resistance heating wires), the shape is cut or punched out of the textile fabric.

In a specific embodiment of the invention, one or more than one heating wires are stitched onto the textile fabric. To this end, an embroidery process scan be used. One or more stitching yarns are used to stitch the heating wires onto the textile fabric. Examples of stitching yarns that can be used are polyamide 6.6, polyamide 6, PTFE and PEEK. Use of PTFE or PEEK stitching yarns has the benefit that higher operational temperatures are possible and allowable in the tank, thanks to the higher temperature resistance of PTFE and PEEK.

Another aspect of the invention is the use in selective catalytic reduction of a tank as described in the invention. The tank for instance comprises a urea or ammonia precursor to this end.

BRIEF DESCRIPTION OF THE FIGURES

FIG. 1 shows an example of a resistance heating element that can be used in the invention.

MODES FOR CARRYING OUT THE INVENTION

As an example a tank is provided made out of polyethylene and comprising a water based solutions of 32.5% urea and an electrical heating element immersed in the solution.

FIG. 1 shows an example of a resistance heating elements 10 that can be used in the invention. A textile fabric 12 is cut or punched according to a certain pattern, as specific by the tank and the accessories (e.g. pump) in the tank. Section 14 for instance will be positioned in the tank around the central pump housing. An electrical heating wire 14 is stitched onto the textile fabric by means of a stitching yarn 18. The resistance heating elements can be connected by means of contacts 19 to a power supply. Preferably the fixation of the heating wire onto the textile fabric is done before punching or cutting the textile fabric pattern. The textile fabric (with the heating wire fixed onto it) can be present in the tank according to a double curved surface or three dimensional surface. To this end, the two legs can e.g. be bent in the tank to take specific positions in the tank.

The electrical resistance heating element can comprise a woven fabric made out of polyamide 6.6 monofilament. The polyamide 6.6 monofilament has a diameter of 350 µm and a circular cross section. The fabric is woven in a 2/1 twill weave. The gauze openings of the fabric are 590 µm. The fabric has a cover factor of 0.605. The fabric has a mass of 300 g/m$^2$ and the thickness of the fabric is 750 µm. After weaving, the fabric has been thermally stabilized.

Onto the fabric a heating cord is stitched, e.g. using a PTFE (polytetrafluorethylene) stitching yarns. The positioning of the one or more heating cords on the fabric surface are among others determined by the requirement for heat generation in the different section of the tank and by the shape of the tank. After stitching the heating wire onto the fabric, the fabric is cut or punched to size and shape. The shape is determined by the design of the tank and by where heating is required in the tank.

In an example stitched on the fabric is a heating wire made out of metal filaments that have a copper core and a sheath out of stainless steel. The volume percentage of copper in the metal filaments is 34%. The metal filaments are single end drawn to a diameter of 0.058 mm; the filaments are having an electrical resistance of 18.3 Ohm/meter length (at 20° C.). Seven of these filaments are twisted together forming a strand. Twelve of these strands are twisted together to form a heating wire. The heating wire has an electrical resistance of 0.22 Ohm/meter length (at 20° C.). The heating cord is provided with a PFA (perfluoroalcoxy) coating to counter as much as possible the effects of corrosion in the SCR tank. The heating cord is coated with PFA (perfluoroalcoxy)-coating (with thickness 0.40 mm). The heating cord has—after coating—a diameter of 1.45 mm. For instance two circuits each of a length of 7 meter heating wire are stitched onto the fabric by means of a PTFE (polytetrafluorethylene) stitching yarn.

In another example a heating wire is comprising metal filaments that have a steel layer, surrounded with a layer in copper, and again surrounded by a layer in nickel, tin or zinc. For instance CCS30 is used surrounded by a layer in nickel (with e.g. 4 percent nickel by weight to the total weight of the metal filament). Nineteen such metal filaments each of a diameter 0.135 mm are twisted together to form a wire with an equivalent diameter of 0.76 mm. Around the wire, a PFA coating is applied with thickness 0.35 mm. This electrical heating wire has a resistance of 0.219 Ohm/meter length (at 20° C.) and is stitched on the textile fabric.

The invention claimed is:

1. A tank assembly comprising:
a selective catalytic reduction tank;
a water or solvent based solution, dispersion or emulsion provided in the selective catalytic reduction tank, the water or solvent based solution, dispersion or emulsion comprising a precursor configured for selective catalytic reduction; and
an electrical resistance heating element assembled in the selective catalytic reduction tank and immersed in the water or solvent based solution, dispersion or emulsion, the electrical resistance heating element configured to carry an electrical current,
wherein the electrical resistance heating element comprises a textile fabric and at least one electrical heating wire comprised of metal filaments or metal fibers,
wherein the electrical heating wire is fixed onto the textile fabric,
wherein the textile fabric is present in the selective catalytic reduction tank according to a double curved or three dimensional surface such that an arrangement of the textile fabric in the selective catalytic reduction tank is bent in more than one plane of the textile fabric and deviates from a planar arrangement,
wherein the tank assembly is attached to an exhaust of a motor vehicle.

2. The tank assembly as in claim 1, wherein the water or solvent based solution, dispersion or emulsion comprises the precursor configured for selective catalytic reduction of nitrogen oxides.

3. The tank assembly as in claim 1, wherein the double curved or three dimensional surface is provided by cutting and folding legs of the textile fabric, each leg comprising part of a heating cord, by draping the textile fabric in a curved way in the selective catalytic reduction tank, or a combination thereof, thereby deviating from the planar arrangement.

4. The tank assembly as in claim 1, wherein the textile fabric is an open textile fabric with a cover factor lower than 0.7.

5. The tank assembly as in claim 1, wherein the electrical heating wire comprises a polymer coating layer.

6. The tank assembly as in claim 5, wherein the polymer coating layer comprises a silicone coating.

7. The tank assembly as in claim 5, wherein the polymer coating layer comprises a coating containing fluorine.

8. The tank assembly as in claim 1, wherein at least a portion of the metal filaments or the metal fibers is comprised of a layer of copper or a copper alloy and a surrounding layer of steel.

9. The tank assembly as in claim 1, wherein the electrical heating wire has a smallest radius of bending smaller than 1.5 times a diameter of the electrical heating wire.

10. The tank assembly as in claim 1, wherein the textile fabric comprises a polymer coating.

11. The tank assembly as in claim 1, wherein the textile fabric is a woven fabric or a warp knitted fabric.

12. The tank assembly as in claim 1, wherein the textile fabric comprises monofilaments as yarns.

13. The tank assembly as in claim 1, wherein the electrical heating wire is stitched onto the textile fabric.

14. The tank assembly as in claim 1, wherein the precursor configured for selective catalytic reduction comprises a urea precursor or an ammonia precursor.

15. The tank assembly as in claim 1, wherein at least a portion of the metal filaments or the metal fibers is comprised of a steel layer, a first surrounding layer of copper or a copper alloy, and a second surrounding layer of nickel, zinc, tin or alloys thereof that surrounds the first surrounding layer.

16. The tank assembly as in claim 1, wherein at least a portion of the metal filaments or the metal fibers is comprised of a layer of low carbon steel or high carbon steel, and a surrounding layer of nickel, zinc, tin or alloys thereof.

17. The tank assembly as in claim 1, wherein at least a portion of the metal filaments or the metal fibers is comprised of one or more stainless steel multifilaments.

18. The tank assembly as in claim 1, wherein the textile fabric is an open textile fabric.

* * * * *